J. A. TAFT.
METHOD AND APPARATUS FOR BALING COTTON AND THE LIKE.
APPLICATION FILED JULY 3, 1917.

1,265,972.

Patented May 14, 1918.
2 SHEETS—SHEET 1.

Inventor:
John A. Taft,
by Ramsey and Parmelee
Attys.

J. A. TAFT.
METHOD AND APPARATUS FOR BALING COTTON AND THE LIKE.
APPLICATION FILED JULY 3, 1917.

1,265,972.

Patented May 14, 1918.
2 SHEETS—SHEET 2.

Inventor:
John A. Taft,
by Ramsey and Parmelee
Attys.

UNITED STATES PATENT OFFICE.

JOHN A. TAFT, OF SAN ANTONIO, TEXAS, ASSIGNOR TO REAGAN BALE COMPANY, OF SAN ANTONIO, TEXAS, A CORPORATION OF TEXAS.

METHOD AND APPARATUS FOR BALING COTTON AND THE LIKE.

1,265,972.            Specification of Letters Patent.      Patented May 14, 1918.

Application filed July 3, 1917.  Serial No. 178,357.

*To all whom it may concern:*

Be it known that I, JOHN A. TAFT, a citizen of the United States, and a resident of the city of San Antonio, in the county of Bexar and State of Texas, have invented certain new and useful Improvements in Methods and Apparatus for Baling Cotton and the like; of which the following is a specification.

This invention relates broadly to packaging and baling and more particularly to the method and to a machine for forming a cylindrical cotton bale.

One of the principal objects of this invention is to provide a machine for making cylindrical bales of cotton or the like which shall be of substantially uniform density, a tension being exerted around the major portion of the bale periphery to increase the density without any increase in the amount of power required to form the bale.

A further object of this invention is to provide a mechanism for forming a cylindrical cotton bale, which mechanism is provided with means for compressing successive layers of cotton into a cylindrical bale, and simultaneously subjecting a portion of the bale to a tension exerted by the compression rolls.

Another object of this invention is to provide a cylindrical cotton bale press wherein the compressing action is maintained between a member at the center of the bale and members having peripheral alined contact with the bale, and then revolving the last mentioned members at different speeds to cause the layers of cotton to be wound and compressed and drawn tightly around the periphery of the bale during its formation.

A still further object of this invention is to provide a machine for forming high density cylindrical cotton bales wherein the bale is formed between a rotary core having a stationary rotating axis, and wherein the compressing forces are exerted between the core and receding compression rolls located beneath the core and driven at different peripheral speeds, whereby the bale is rotated by surface contact with the rolls, and is subjected to alternate tension and compressive forces effective circumferentially, and to compression forces effective radially thereof.

A still further object of the present invention is to provide a machine for forming a cylindrical bale around a rotating core having a stationary axis, wherein a pair of compression rolls is located beneath the core on opposite sides of a vertical plane passing therethrough, for exerting radial compressing forces on the bale during its formation, and driving said rolls at different peripheral speeds whereby the layers of material forming the bale are subjected to alternate tension and compression forces circumferentially applied simultaneously with the application of the radial forces.

A still further and principal object of this invention is the method of forming a cotton bale by simultaneously subjecting a major portion of the bale to a tension force, and a minor portion of the bale to a compression force, said forces being effective circumferentially of the bale.

These objects together with attendant advantages will be apparent as the invention becomes better understood by reference to the accompanying specification and drawings forming a part thereof, throughout which like characters of reference have been used to indicate like parts in the several views.

It has heretofore been proposed to form cylindrical cotton bales and the like by supplying a strip of cotton batting to the rolls, and subjecting the same in its passage thereto to a combined stretching and compressing action secured by providing a plurality of rolls driven at successively increasing speeds. The batting in its final compressed and stretched condition is then formed into a suitable bale. It has further been proposed to form a bale by the action of three or more compression rollers having peripheral contact with the bale and driven at successively increasing speeds. A modification of this latter form of press has been used having a pair of compression rollers acting upon a movable core and driven at successively increasing speeds.

Where the bat has been subjected to compression and tension forces before it has passed to the core around which the bale is formed, part of the effectiveness is lost and it is necessary to use a high degree of compression in order to form a bale having the desired density. In the machines employing compression rolls acting directly on the bale during its formation, the bale is formed by slightly increasing the speed of each succeeding roller, whereby a tension force is secured in the comparatively short distance between the adjacent contact points of adjacent rollers, and a compression force secured throughout the much greater distance from the points of contact of the rolls over top of the bale. Such action has been found to result in a loosening of the fibers so that the finished bale does not have a high density.

All of the foregoing difficulties are overcome in the press herein shown in which the cotton batting is subjected to the action of rollers having peripheral contact with the bale, the speed of rotation of each successive roll being less, whereby a compression force is secured between the points of the contact of the rolls beneath the core center, and a tension is secured between the much greater distance from one of these points to the other over top of the bale.

Referring now more particularly to the drawings, Figure 1 is an end view partly in section of a double press involving my invention.

Figure 1:
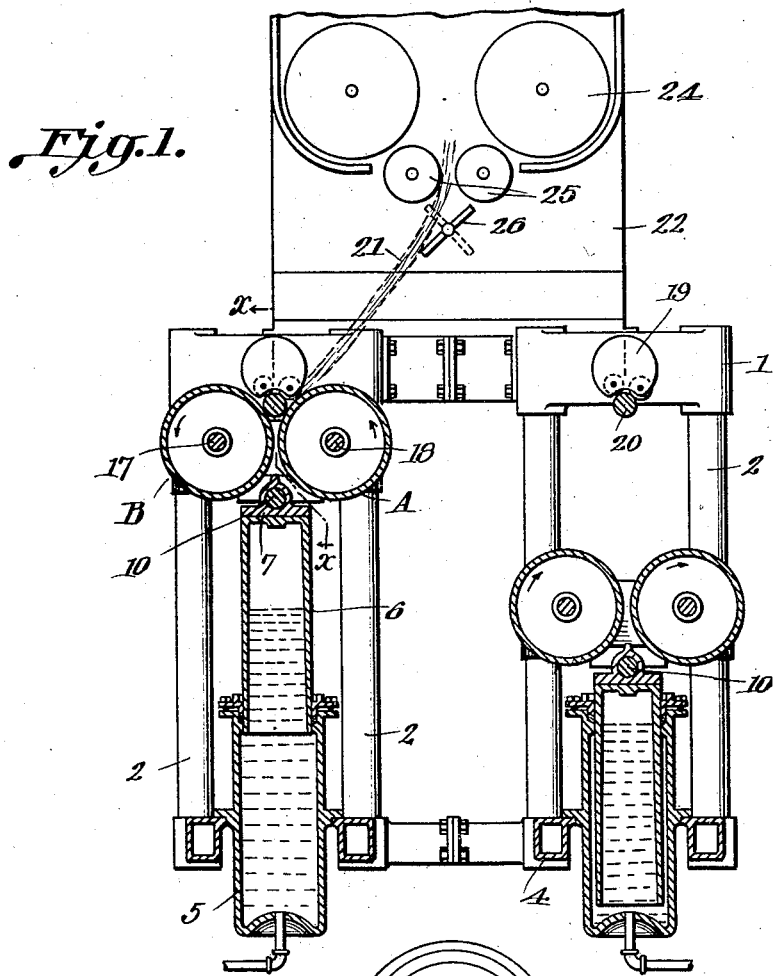

Referring more particularly to the drawings, there is illustrated broadly the type of press disclosed and claimed in my copending application Serial No. 92,391, filed April 20, 1916. This press preferably comprises a head frame 1 suitably supported on vertical guides 2 mounted in the base frame 4. The press is preferably of the type employing two sets of bale forming devices to each condenser, both of which devices are alike in operation. For this reason a description of one is believed to suffice. Mounted in the base frame 4 is a cylinder 5 of a combined hydro pneumatic cushioning and lifting ram. Slidably mounted in the cylinder 5 is a hollow piston 6 having an extension 7 formed on the upper end thereof rigidly secured to the cross bar 8 carrying the cross head 9 slidable on the guides 2. Journaled in the cross head 9 is a driving shaft 10 adapted to receive power through the beveled gears 11 and transmit the same to suitable compression rolls A and B through the driving gear 12. Since it is desired to rotate the compression rolls A and B at different speeds, with the roll B revolving slower than the roll A, the driving may be accomplished by meshing the gear 12 with the gear 14, and driving the gear 15 therefrom through the intermediate spur gear 16. The gears 14 and 15, which are mounted respectively on the shafts 17 and 18 of the compression rolls B and A, are indicated as being unequal in size, the gear 14 preferably having a few more teeth than the gear 15. It will be evident that upon operating the press that the roll A will be revolved slightly faster than the roll B, for the purposes hereinafter more fully explained.

Mounted on the head frame 1 are antifriction bearings 19 of any suitable construction adapted to sustain upward thrust exerted on the core bar 20 during the formation of a bale of cotton therearound.

For supplying cotton batting 21 to the core and compression rolls, I have indicated a condenser 22 on the upper frame of the press, having suitable bat forming rolls 24 and pressure rolls 25. The bat from the pressure rolls may be directed to either press at will by means of the pivoted gate or valve 26.

The press is preferably of the type employing a tapered core 20 having a fixed axis of rotation, the compression rolls receding therefrom, as the bale increases in diameter, against the action of the fluid entrapped in the hollow piston 6 of the hydro pneumatic device.

Figure 4:
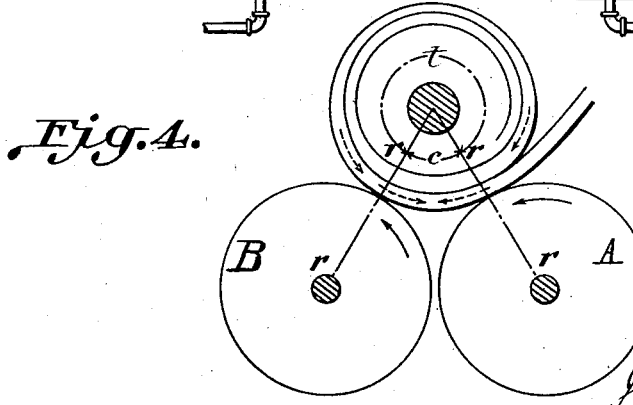
Fig. 4 is a diagrammatic view illustrating the action of the rolls on the bale being formed.
Figure 2:
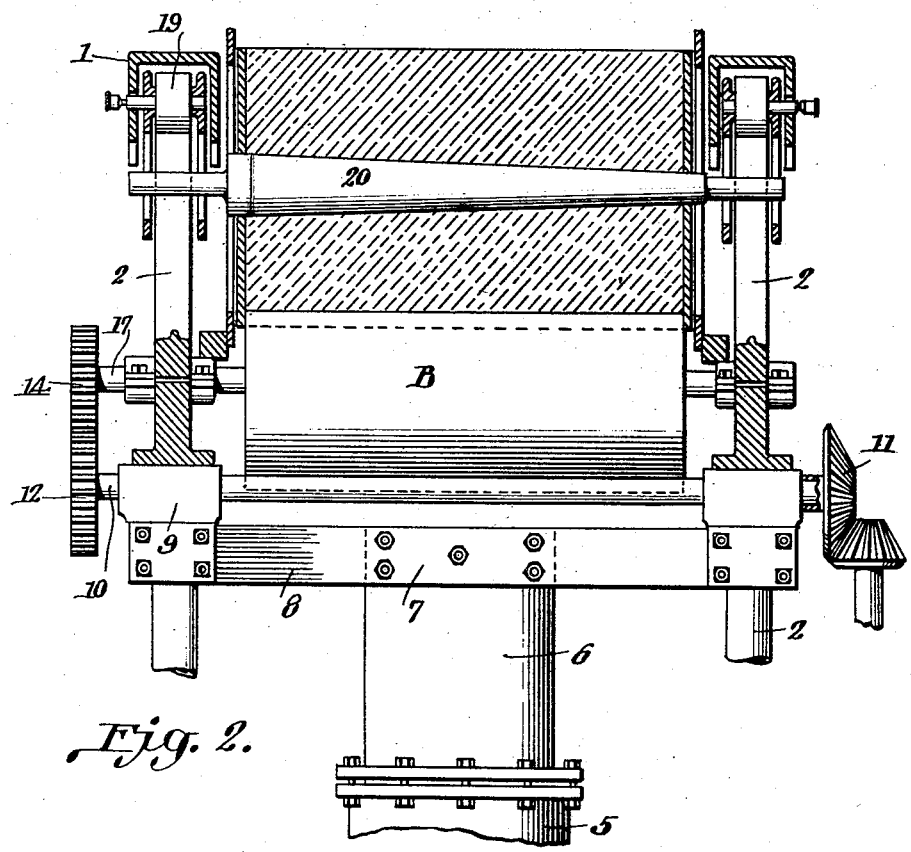
Fig. 2 is a vertical sectional view on the line $x$—$x$ of Fig. 1 looking in the direction of the arrows.
Figure 3:
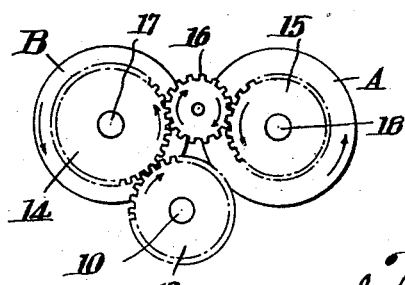
Fig. 3 is a detail view of a driving means for the compression rolls.

From the foregoing it will be apparent that as the cotton batting 21 leaves the condenser it will pass into engagement with the inner roll A of the press, as indicated more particularly in Figs. 1 and 4, which revolves in a counter-clockwise direction and thereby tends to wind the same around the core. From the roll A the batting passes to the roll B, which as before explained has a slower speed of rotation than the roll A. This results in the production of a circumferential compression force $c$ between the radial compression lines $r$. This tends to firmly force together and pack the cotton fibers so that they occupy a minimum space, this being desirable for producing a bale having a high density. After the batting leaves the roll B it is carried around the core 20 and again into the zone of influence of the compression roll A. Since the roll B does not feed the batting to roll A at a speed corresponding to the peripheral speed of rotation of roll A, a circumferential tension $t$ is exerted on the batting and bale being formed which extends from the radial compression lines $r$ over top of the core. From an inspection of the diagrammatic showing in Fig. 4 it will be obvious that the circumferential compression force is effective simultaneously with the radial compression forces throughout a comparatively small portion of the bale during its rotation, while the tension force is effective throughout a comparatively large portion of the bale. This tension force is effective in drawing down the entire mass of fibers, thereby decreasing the circumference of the bale.

In actual operation it has been found that a bale can be produced having the same weight as bales heretofore made by other processes, but having a diameter of from two to three inches less. This enables the production of a bale of high density, that is a maximum amount of cotton in a minimum of space, such a bale being desirable from a shipping standpoint. It has also been found convenient to apply the bagging to the bale while the same is held in the press by operating the compression rolls in the same manner, the rolls tending to draw the bagging tightly around the bale.

It will now be seen that this invention differs in its operation from presses heretofore produced in which the compression roll corresponding broadly to the roll B of applicant's press is rotated faster than the roll corresponding to applicant's compression roll A. With such a press the positions of the tension and compression forces are reversed, and as the circumferential compression occurs throughout a zone which is not subjected to radial pressure between the compression rolls to the core of the bale, a disastrous loosening of the fibers results.

In as much as the method of baling cotton herein described may be carried out by means other than that disclosed, it is intended that the particular apparatus shall be illustrative only of a preferred form.

What I claim is:—

1. A cotton press provided with a plurality of rolls, one receiving the bat from the other and acting upon different parts of the bale as it is being formed, and means for rotating the second roll slower than the first.

2. A cotton press, provided with lower compression rolls located at substantially the same height, one of said rolls being arranged to receive the bat from the other, and adapted to act upon a different part of a bale as it is being formed, and means for rotating the second roll slower than the first 3. In a press of the class described, a bat forming means, a core pin having a fixed axis of rotation, a pair of opposed compression rolls for receiving the bat and winding it about the core, and means for driving said rolls, one of said rolls being operative at greater speed than the other to exert a tightening tension on the windings.

4. In a press of the class described, bat forming means, a core pin having a fixed axis of rotation, a pair of opposed vertically movable compression rolls arranged below and on opposite sides of the core pin for winding the bat around the same, one of said rolls being operative at a greater speed than the other to exert a tightening tension on the windings, and means for opposing a yielding resistance to the movement of the rolls away from the core.

5. In a press of the class described, a bat forming means, a core pin, a pair of compression rolls for receiving the bat and winding it around the core, said compression rolls being adapted to exert a radially effective compression on the bale during its formation, and means for driving said rolls, one of the rolls being operative at a greater speed than the other to exert a circumferential compression on the windings between the lines of radial compression.

6. In a press of the class described, a bat forming means, a core pin, a pair of compression rolls for receiving the bat and winding it about the core, said rolls exerting a radially effective compression on the bale below the axis of the core pin during its formation, and means for driving said rolls, one of said rolls being operative at a greater speed than the other to exert a circumferentially effective compression on the bale between the lines of radial compression beneath the core, and a circumferentially effective tension on the bale above the core.

7. In a bale forming press having means for feeding a bat thereto, a core pin, a pair of compression rolls for receiving the bat and winding it about the core pin, and means for driving said rolls, one of said rolls being operative at a slower speed than the other to exert a circumferentially effective compression throughout a comparatively small portion of the bale as it is being formed, and a circumferentially effective tension throughout the remainder of the bale.

8. The method of forming a round cotton bale, which consists in subjecting the bale to a circumferential compression force effective throughout less than half of the circumference of the bale, and a circumferentially effective tension force effective throughout the remaining portion of the bale.

9. The method of forming a lapped bale, which consists in subjecting the bale during its formation to radial compression forces, and producing a circumferentially effective compression force effective throughout less than half of the circumference of the bale, and a circumferentially effective tension force effective throughout the remaining portion of the bale.

10. The method of forming a lapped bale, which consists in subjecting the bale during its formation to radial compression forces, and producing a circumferentially effective compression force effective throughout less than half of the circumference of the bale, and a circumferentially effective tension force effective throughout the remaining portion of the bale, said circumferentially effective forces terminating on the lines of radial compression.

11. In a round bale forming press, means for rolling the bat into a bale, and mechanism for operating said means to produce a circumferential compression force effective throughout less than half of the circumference of the bale, and a circumferentially effective tension force effective throughout the remaining portion of the bale.

12. In a round bale forming press, means for simultaneously rolling the bat into a bale and producing radial compression forces therein, and mechanism for operating said means to produce a circumferential compression force effective throughout less than half of the circumference of the bale, and a circumferential tension force effective throughout the remaining portion of the bale.

13. In a bale forming press in combination, a core pin, a pair of opposed rolls for receiving a bat and winding it about the core pin, and means for driving said drums, one of said drums being operative at a greater peripheral speed than the other to exert a tightening tension on the windings.

14. In a bale forming press in combination, a core pin, a pair of opposed rolls for receiving a bat and winding it about the pin, and means for driving said drums, one of said drums being operative at a greater peripheral speed than the other to exert a circumferentially effective tension on the windings effective around the major portion of the bale.

JOHN A. TAFT.

Copies of this patent may be obtained for five cents each, by addressing the "Commissioner of Patents, Washington, D. C."